(12) United States Patent
Hirvonen et al.

(10) Patent No.: US 8,104,720 B2
(45) Date of Patent: Jan. 31, 2012

(54) SYSTEM AND METHOD FOR AN INTEGRATED BACKUP CONTROL SYSTEM

(75) Inventors: Jukka Matti Hirvonen, Pooler, GA (US); Gary Palfreyman, Pooler, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 0 days.

(21) Appl. No.: 13/019,226

(22) Filed: Feb. 1, 2011

(65) Prior Publication Data

US 2011/0190965 A1 Aug. 4, 2011

Related U.S. Application Data

(63) Continuation of application No. 11/654,474, filed on Jan. 17, 2007, now Pat. No. 7,878,461.

(60) Provisional application No. 60/759,029, filed on Jan. 17, 2006.

(51) Int. Cl.
*B64C 13/00* (2006.01)
*B64C 13/42* (2006.01)

(52) U.S. Cl. ........ 244/194; 244/221; 244/229; 244/99.4

(58) Field of Classification Search .................. 244/220, 244/221, 223, 228, 229, 234, 236, 237, 175, 244/194, 195, 196, 99.2, 99.4, 99.9; 318/564
See application file for complete search history.

(56) References Cited

U.S. PATENT DOCUMENTS

| | | | |
|---|---|---|---|
| 4,032,757 A | 6/1977 | Eccles | |
| 4,130,241 A | 12/1978 | Meredith et al. | |
| 4,198,017 A | 4/1980 | Murray | |
| 4,236,685 A | 12/1980 | Kissel | |
| 4,363,098 A | 12/1982 | Buus et al. | |
| 4,370,706 A | 1/1983 | Doniger et al. | |
| 4,504,233 A | 3/1985 | Galus et al. | |
| 4,517,639 A | 5/1985 | Ferrell et al. | |
| 4,533,097 A | 8/1985 | Aldrich | |
| 4,542,679 A | 9/1985 | Murphy et al. | |
| 4,598,292 A | 7/1986 | Devino | |

(Continued)

FOREIGN PATENT DOCUMENTS

DE 42 27 157 A1 11/1994

(Continued)

OTHER PUBLICATIONS

Office Action issued May 1, 2011 in Isreal Application No. 192854.

(Continued)

*Primary Examiner* — Tien Dinh
*Assistant Examiner* — Richard R Green
(74) *Attorney, Agent, or Firm* — Ingrassia Fisher & Lorenz, P.C.

(57) ABSTRACT

Embodiments of the invention relate to a flight control system for controlling an aircraft in flight having a backup control system integrated into an active control stick. The actuated control stick may include a processing unit that includes independent and separate hardware and/or software dedicated to the primary control system and the backup control system. For the primary control system, the processing unit may receive a sensed primary control stick signal and communicate with a primary processor, which may be configured to generate a primary control signal. For the backup control system, the processing unit may receive a sensed backup control stick signal and generate a backup control signal. The processing unit may also generate tactile signal for use by the actuated control stick to adjust the feel of a pilot's control stick.

21 Claims, 3 Drawing Sheets

U.S. PATENT DOCUMENTS

| | | |
|---|---|---|
| 4,626,851 A | 12/1986 | Tooze |
| 4,644,538 A | 2/1987 | Cooper et al. |
| 4,652,417 A | 3/1987 | Sutherland et al. |
| 4,672,529 A | 6/1987 | Kupersmit |
| 4,807,516 A | 2/1989 | Takats |
| 4,811,230 A | 3/1989 | Graham et al. |
| 4,887,214 A | 12/1989 | Takats et al. |
| 5,012,423 A | 4/1991 | Osder |
| 5,062,594 A | 11/1991 | Repperger |
| 5,076,517 A | 12/1991 | Ferranti et al. |
| 5,091,847 A | 2/1992 | Herbermann |
| 5,264,768 A | 11/1993 | Gregory et al. |
| 5,274,554 A | 12/1993 | Takats et al. |
| 5,347,204 A | 9/1994 | Gregory et al. |
| 5,374,014 A | 12/1994 | Traverse et al. |
| 5,383,133 A | 1/1995 | Staple |
| 5,412,299 A | 5/1995 | Gregory et al. |
| 5,473,235 A | 12/1995 | Lance et al. |
| 5,493,497 A | 2/1996 | Buus |
| 5,515,282 A | 5/1996 | Jackson |
| 5,527,002 A | 6/1996 | Bilange et al. |
| 5,559,415 A | 9/1996 | Gregory et al. |
| 5,634,794 A | 6/1997 | Hildreth et al. |
| 5,668,542 A | 9/1997 | Wright |
| 5,670,856 A | 9/1997 | Le et al. |
| 5,694,014 A | 12/1997 | Hegg et al. |
| 5,735,490 A | 4/1998 | Berthet et al. |
| 5,743,490 A | 4/1998 | Gillingham et al. |
| 5,806,805 A | 9/1998 | Elbert et al. |
| 5,806,806 A | 9/1998 | Boehringer et al. |
| 5,875,998 A | 3/1999 | Gleine et al. |
| 5,881,971 A | 3/1999 | Hickman |
| 5,911,390 A | 6/1999 | Pohling |
| 5,978,715 A | 11/1999 | Briffe et al. |
| 6,000,662 A | 12/1999 | Todeschi et al. |
| 6,038,498 A | 3/2000 | Briffe et al. |
| 6,064,923 A | 5/2000 | Bilange et al. |
| 6,082,672 A | 7/2000 | Audren |
| 6,112,141 A | 8/2000 | Briffle et al. |
| 6,128,554 A | 10/2000 | Damotte |
| 6,189,836 B1 | 2/2001 | Gold et al. |
| 6,381,519 B1 | 4/2002 | Snyder |
| 6,443,399 B1 | 9/2002 | Yount et al. |
| 6,459,228 B1 | 10/2002 | Szulyk et al. |
| 6,561,463 B1 | 5/2003 | Yount et al. |
| 6,573,672 B2 | 6/2003 | O'Rourke et al. |
| 6,622,972 B2 | 9/2003 | Urnes, Sr. et al. |
| 6,648,599 B2 | 11/2003 | Preissler |
| 6,650,973 B2 | 11/2003 | Yamamoto |
| 6,693,558 B2 | 2/2004 | Hedrick |
| 6,704,624 B2 | 3/2004 | Ortega et al. |
| 6,735,500 B2 | 5/2004 | Nicholas et al. |
| 6,791,476 B1 | 9/2004 | Hedrick |
| 6,796,526 B2 | 9/2004 | Boehringer |
| 6,799,739 B1 | 10/2004 | Jones |
| 6,842,672 B1 | 1/2005 | Straub et al. |
| 6,860,452 B2 | 3/2005 | Bacon et al. |
| 6,867,711 B1 | 3/2005 | Langner et al. |
| 7,012,553 B2 | 3/2006 | Hedrick |
| 7,878,461 B2 | 2/2011 | Hirvonen et al. |
| 2002/0065582 A1 | 5/2002 | Morrison et al. |
| 2003/0127569 A1 | 7/2003 | Bacon et al. |
| 2004/0078120 A1 | 4/2004 | Melkers et al. |
| 2004/0078121 A1 | 4/2004 | Cartmell et al. |
| 2004/0098140 A1 | 5/2004 | Hess |
| 2004/0195460 A1 | 10/2004 | Sailer |
| 2004/0238688 A1 | 12/2004 | Audren |
| 2007/0164166 A1 | 7/2007 | Hirvonen et al. |
| 2009/0128366 A1 | 5/2009 | Firra et al. |

FOREIGN PATENT DOCUMENTS

| | | |
|---|---|---|
| DE | 4227157 | 11/1994 |
| JP | 10059293 | 3/1998 |
| JP | 10059293 A | 3/1998 |
| WO | 9529834 A1 | 11/1998 |
| WO | WO 9529434 | 11/1998 |

OTHER PUBLICATIONS

Office Action issued Jan. 22, 2009 in U.S. Appl. No. 11/654,474.
Office Action issued Aug. 5, 2009 in U.S. Appl. No. 11/654,474.
Office Action issued Feb. 22, 2010 in U.S. Appl. No. 11/654,474.

SYSTEM AND METHOD FOR AN INTEGRATED BACKUP CONTROL SYSTEM

CROSS-REFERENCE TO RELATED APPLICATIONS

This application is a continuation of U.S. patent application Ser. No. 11/654,474, filed Jan. 17, 2007, U.S. Pat. No. 7,878,461, issued on Feb. 1, 2011 and entitled "System and Method for an Integrated Backup Control System," which claims priority to U.S. Provisional Patent Application 60/759,029, filed Jan. 17, 2006, and entitled, "Integrated Control Stick and Backup Controller" which is assigned to the assignee of the present invention and is hereby incorporated by reference in its entirety. This application is related to co-pending U.S. patent application Ser. No. 11/654,890 filed on Jan. 17, 2007, entitled "Apparatus and Method for a Backup Control System for a Distributed Flight Control System," which is also assigned to the assignee of the present invention and is hereby incorporated by reference in its entirety. The complete disclosure of each of the above-identified applications is hereby fully incorporated herein by reference.

FIELD OF THE INVENTION

Embodiments of the invention relate generally to aircraft flight control systems, and, more specifically, to an integrated backup control system.

BACKGROUND OF THE INVENTION

With the rapid developments in aircraft technology, ever-increasing flight envelopes, and overall performance, the flight control systems implemented in modern aircraft have become extremely complex. Advanced flight control systems have been developed to address various aircraft characteristics such as flight performance, fuel efficiency, safety, etc. A fly-by-wire flight control system on modern aircraft typically includes a complex set of components including pilot sensors and controls, electronic processor, electronic wiring or data buses, actuators, and control surfaces.

In addition to primary control systems and control components, advanced aircraft often require a certain degree of redundancy in the control systems for safety requirements. The redundancy or backup system of a primary control system typically increases as the criticality of a control functions increases. Even with a carefully designed primary flight control system, it may be difficult to completely prevent so-called common mode failures within a control system, where an error or generic fault propagates from the primary control system to the redundant or backup components. A common mode failure also includes a generic fault that impacts all the identical redundant system elements simultaneously. As a consequence, redundant or backup control system may be configured as fully redundant and dissimilar, which unfortunately increases the part count or line-replaceable unit (LRU) count, cost, and weight for an aircraft. This problem can be especially difficult when the control system utilized a distributed fly-by-wire control system, where the actuators on the aircraft include their own servo loop closure electronics at or near the actuator.

A backup control system may vary between a completely redundant backup control system, duplicating the components and the performance of the primary control system, and a scaled down or minimum flight control system, reducing performance but saving on weight and cost. Because fully redundant backup control systems are expensive and often excessive, backup systems may be configured as simple as possible, making them robust and reliable while reducing cost and weight. Further, in order to prevent common mode failures, a backup system may be configured as independent and dissimilar, employing separate processors and flight computers for use in the event a failure in the primary control system.

On some advanced control systems for military aircraft, an active control stick in the cockpit may be used to actively shape the feel of the control stick by applying force or resistance on the control stick. The "active feel" of the active control stick or computer actuated control stick may be based on pilot inputs, aircraft configuration and flight conditions and may provide a pilot or copilot with improved situational awareness. For example, the improved situational awareness may include better coordination between pilots by electrically coupling the control sticks on each side of the cockpit, similar to the traditional cable driven coupling between control sticks. In addition to the pilot-to-pilot coupling, an active control stick can be made to follow the Autopilot commands so that the stick moves according to the Autopilot command inputs, giving the pilots better awareness of aircraft.

Other advanced features of an active control stick may include soft stops within the feel gradient of an active stick, which may be used to indicate various envelop and performance limits. For example, when the aircraft is approaching a stall condition, an active stick could incorporate a soft stop in the feel gradient to give a pilot a cue that he is approaching some predetermined margin (e.g. 15% from stall). Equivalently, a soft stop in the feel gradient could indicate an aircraft load factor limitation or attitude angle limitation. The pilot may then have the option to override such limits if he or she deems that appropriate. Yet another example of an advanced feature of an active control stick could be a variable amplitude and/or frequency stick shaker, which could be implemented so that the amplitude of the shaker function increases as the aircraft gets closer and closer to the stall angle of attack, for example.

To accomplish these active control stick functions, extensive processing may be required by stick control electronics to perform flight calculations and compute specific force loop functions, which dictate the amount and direction of force or resistance to apply to the control stick in a given flight condition. Although these calculations may be performed by the primary flight control electronics, such an arrangement may consume significant computing power needed for the primary control system. As such, typical active control sticks include independent and dedicated electronics and processors capable of performing the necessary computations for the active stick control, leaving the primary flight control electronics free to perform other flight critical functions.

SUMMARY OF THE INVENTION

Separate processors and flight computers may include significant computing power that may remain unused or underutilized during normal operations. In some cases, other processors or flight electronics may go underutilized in the typical design of an advanced control system. The flight electronics used to drive an active flight control stick may also have go underutilized under normal operating conditions or have excess processing capacity available.

In accordance with embodiments of the invention, a distributed backup control system may be integrated with the drive electronics or processing unit of an active control stick. One embodiment of the invention may include a flight control system for controlling an aircraft in flight having a first actuated control stick and a second actuated control stick. Each actuated control stick may include a primary sensor, a backup sensor, and a processing unit having at least one processor configured to generate a tactile signal for the actuated control stick. Each processing unit may includes a set of primary electronics may be coupled to a primary sensor and a set of backup electronics coupled to a backup sensor. The flight control system may also include a primary processor coupled to the sets of primary electronics and may be located external to the processing units. The primary processor may generate a primary control signal for use by aircraft actuators. The sets of backup electronics may be configured to generate backup control signals for use by the aircraft actuators. In the event that the actuators determine that the primary control signal is invalid, the aircraft actuators may be configured to use the backup control signals.

DETAILED DESCRIPTION OF THE INVENTION

Figure 1:
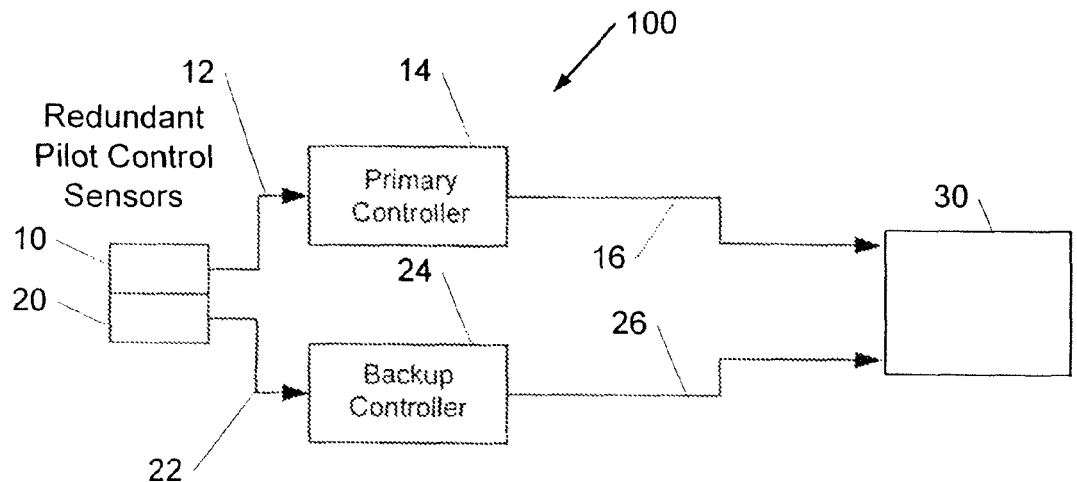
FIG. 1 schematically illustrates a flight control system in accordance with one embodiment of the present invention.

The present disclosure will now be described more fully with reference to the Figures in which various embodiments of the present invention are shown. The subject matter of this disclosure may, however, be embodied in many different forms and should not be construed as being limited to the embodiments set forth herein.

In accordance with one embodiment of the present invention, the processors and computing capability of the active control stick may be integrated into the communications for the control systems for the aircraft such that the active control stick may also function as a backup control system processor. The electronics in the active control stick, also referred to as a smart cockpit controller, may be utilized as a backup controller or an integrated sensor data processor. As understood by those of skill in the art, the primary control system may still be configured to meet all the safety requirements in terms of redundancy and monitoring capabilities. Likewise, it should be understood that the active control stick electronics may be configured to meet the same safety requirements as the primary control system or some other level of redundancy. When including an active control stick on an aircraft, embodiments of the invention may take advantage of the computing resources of the active control stick electronics without adding another system to act as a backup control system. A backup control system that is integrated into the active control stick electronics may avoid replication of every element of the primary flight control system while taking advantage of the signal conditioning and processing power of the active control stick electronics unit. Additionally, such an arrangement may be used to configure the backup control system with dissimilar and independent processing and communication features when compared to the primary control system. Although the active control stick may be used by the backup control system, it is contemplated that the active feel of the stick may be unnecessary in the event that the primary control system fails.

In accordance with embodiments of the invention, the control stick electronics unit or processing unit may be divided into two separate and independent applications. For example, the control stick processing unit may include a primary partition, for use with the primary control system, and a backup partition, for use with the backup control system. As used herein, the term partition is intended to include physically separate and independent hardware and/or separate and independent software that may be fire-walled. In other words, an active control stick processing unit may include primary and backup applications, that may be independent and separate based on their hardware and/or software. The primary and backup partitions may also represent a sets of electronics in the active control stick processing unit that may be separate and independent based on their hardware and/or software.

One embodiment of the present invention may include combining a smart cockpit controller (e.g. control stick with feedback control capability) and a backup processor into one unit. In another embodiment of the present invention, the smart cockpit controller may include a primary partition, which may merely act as communication concentrator and a voter of different digital transmissions, and a backup partition, which includes processing capabilities for the active control stick and the backup control system. In another embodiment of the present invention, the smart cockpit controller may provide a digital or analog signal directly to a separated and stand-alone primary controller unit, such as a primary flight control computer ("FCC") and the smart cockpit controller may include the backup controller as a backup control system for the FCC.

The backup controller may be implemented as a part of the computing functions of the active control stick, such as the pilot force feedback control processor. The backup controller functions may be implemented using advanced electronics and processing or may be implemented using only relatively simple electronic hardware.

Some aircraft include a relaxed static stability or include a particular natural dynamic motion of the aircraft which requires active damping (such as Dutch-roll motion via the yaw damper). In such cases, the backup or backup control system may require certain augmentation signals from sensors (e.g. aircraft angular rates) in order to effectively control the aircraft using the backup control system. In one embodiment of the present invention, the smart cockpit controller and its backup controller partition, in order to optimize sensor arrangement at the aircraft level, may utilize augmentation signals from aircraft sensors typically designated for other aircraft functions.

In aircraft control systems requiring signal augmentation, embodiments of the invention may integrate backup sensors, such as micro electronic mechanical systems ("MEMS") technology or other sensor technologies known to those of skill in the art, into the system architecture by integrating the sensors into the smart cockpit controller, to be used by the active control stick itself, the backup control system, and maybe additional aircraft functions external to the smart cockpit controller. Alternatively, it should be understood that dedicated sensors may be used as stand-alone units. Further, sensors may be independent of the smart cockpit controller but provide signals to the multiple aircraft devices, such as the backup control system and standby display instruments, as examples.

Referring to FIG. 1, a flight control system 100 is schematically shown in accordance with one embodiment of the present invention. As shown, two completely dissimilar processing paths and transmission media provide primary control signals and backup control signals to an aircraft actuator. In some embodiments of the invention, the actuator may include a smart actuator having a remote electronics unit ("REU") that may be configured to determine if the primary control signal is valid and use the primary control signal over the backup control signal for actuation of the actuator.

In FIG. 1, redundant sensors 10 and 20 may be configured to receive control inputs from a pilot or copilot, as discussed above. The primary control system includes the sensor 10 and the primary controller 14 connected by a transmission media 12. The primary control system also includes a transmission media 16, which connects the primary controller 14 with the smart actuator 30. Although a smart actuator is shown in the figures, it should be understood that alternative actuator control arrangements may be implemented without deviating from the scope and spirit of the present invention. For example, a centralized Fly-By-Wire control system using Actuator Control Electronics (ACE) units (not shown in the figures), which typically receive their augmented commands from the primary flight control computers could also receive commands from a backup control system or controller integrated with an active control stick.

A backup control system is shown in FIG. 1 including the sensor 20 and the backup controller 24, which are connected by a transmission media 22. The backup control system also includes a transmission media 26, which connects the backup controller with the smart actuator 30. It should be noted that the primary and backup control systems may be configured independent and dissimilar, as shown in FIG. 1. However, it would be apparent to one of ordinary skill in the art that other configurations of the primary and backup control systems could be implemented with the present invention.

It should be understood that both primary and backup control systems may include sensors, associated with each input control, such as a rudder pedals or control stick, for example. Additionally, the control systems may receive inputs from the many different types of sensors used in flight control system, including sensing multiple axes on a given control instrument, such as sensing for pitch, roll, and perhaps yaw if necessary on a control stick. Although only one sensor is schematically shown in the figures for simplicity, it should be understood that the and backup control systems may be configured to receive many input signals from sensors, controls, and other devices.

Figure 2:
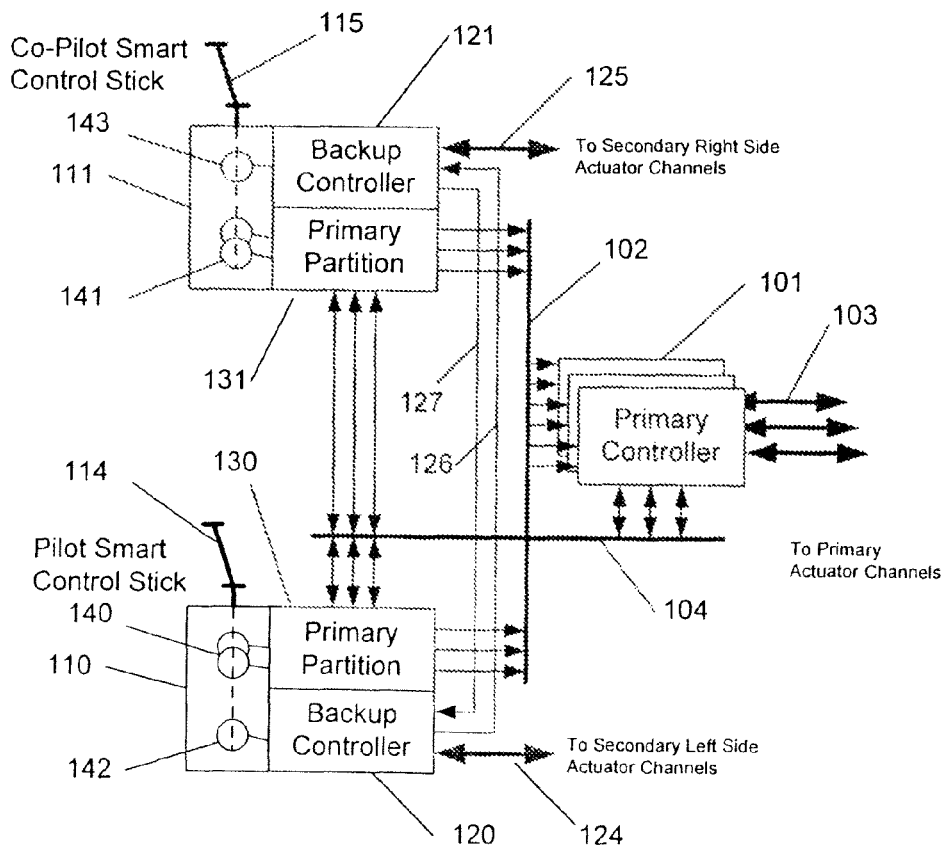
FIG. 2 schematically illustrates another flight control system in accordance with another example of an embodiment of the present invention.

FIG. 2 schematically shows an example of a flight control system 200 in accordance with an embodiment of the present invention. FIG. 2 illustrates a centralized primary control system with redundant primary processors 101, often called flight control computers ("FCC"). The primary processors 101 may receive inputs or sensor signals from the pilot smart cockpit controller or active control stick 110 and the copilot smart cockpit controller 111.

The pilot active control stick 110 may include a control stick 114, a primary sensor 140, a backup sensor 142, a primary partition 130 for the active stick control functions, and a backup partition 120 for the backup control function. The primary partition 130 receives input signals from the control stick 114 via the primary sensor 140. The active control stick 110 may include additional sensors, the number of which may be a function of the overall aircraft level system redundancy requirements. For example, the primary sensor 130 may represent multiple redundant physical sensor elements, such as linear-variable-displacement transducers (LVDT) or rotary-variable-displacement-transducers (RVDT) or other type of sensors.

Likewise, the backup partition 120 for the backup control function receives input signals from the control stick 114 via the backup sensor 142. Again, the sensor 142 may represent a single sensor or multiple sensors depending on the overall backup control system architecture for a given aircraft.

The copilot active control stick 111 may include a control stick 115, a primary sensor 141, a backup sensor 143, a primary partition 131 for the active stick control functions, and a backup partition 121 for the backup control function. The primary partition 131 receives input signals from the control stick 115 via the primary sensor 141. Likewise, the backup partition 121 receives input signals from the control stick 115 and the backup sensor 143.

The primary partitions 130 and 131 of the smart cockpit controllers 110 and 111 may be simply configured to pass the primary sensor signals in an analog format to the primary processors 101 for processing and signal output by the primary flight controller 101. Alternatively, primary partition 130 could process the analog signals form the sensor 140. For example, the primary partition 130 may validate and vote on the redundant primary sensor signals from the sensors 140 and pass a validated pilot control position signal to the primary control system processors 101 in a digital format. The primary controller 101 may take the pilot control inputs and process the inputs in accordance with the aircraft level control laws. For example, the pilot input may include a control surface position for an aileron or other control surface. The processing of the pilots surface position command may include data from various other type of sensors in the aircraft, such as air data and inertial reference data. The primary partition 130 may also receive redundant control signals 104 from the primary processors 101. The signals 104 may include parameters for the basic stick force gradient, any possible soft stops or activation command of a pilot awareness function, such as a stick shaker, and may be used by the primary partition 130 to adjust the feel characteristics of the control stick for the pilot. The primary partition 131 may function in the same way to provide signals to the primary processors 101 and adjust the feel of the control stick 115 using the signals 104.

It should be noted that multiple processors or processing units 101 may be used as the primary flight control computers as shown in FIG. 2. As understood by those of skill in the art, these multiple processors may be packaged in individual enclosures, often referred to as flight control computers ("FCCs"). The processors may also be combined together in one or more enclosures, in which the enclosures are often called control channels. Regardless, each processing element may be divided into a self-checking pair of processors, called a command-monitor type of architecture. Equivalently, a triplex architecture in the flight control computers, in which three processors compute their own commands which are then voted for a mid-value or average, may be employed for the primary control system. The primary control system may include various levels of redundancy and self-monitoring as understood by those of skill in the art.

Alternatively, the backup control system may be constructed as a single string design, where there is only a series of signal and processing paths without any parallel monitoring within the backup system itself. Although such a backup control system arrangement would not include any self-monitoring, the backup control system may be monitored by the primary control system by sending the backup control signal, as received by a smart actuator, back to the primary control system. The primary control system may then compare the backup control signal to a backup controller model within the primary control system as discussed in related co-pending U.S. patent application filed on Jan. 17, 2006, entitled "Apparatus and Method for a Backup Control System for a Distributed Flight Control System." Any discrepancy of such comparison can be announced to the pilots for them to take the appropriate action.

The backup control system shown in FIG. 2 may effectively act as a "hot spare" for the primary control system. The backup system may be implemented through the active control sticks 110 and 111 and the backup partitions 120 and 121. In the event that the primary control system experiences a generic fault, the backup partitions 120 and 121 shown in FIG. 2 may be configured to perform the necessary functions to drive the "active feel" of the control sticks and to process the inputs from the control sticks 114 and 115 for the backup control system. The backup system may also be employed in the event that the aircraft experiences a fault, such as a total loss of electrical power to the primary control system. It should be understood that the backup control system may have an independent power source, allowing the backup control system to survive some aircraft level faults. It is also contemplated that the control stick may revert to passive devices in the event of a generic fault in the primary control system in order to reserve all processing power in the control stick electronics for the backup control system.

In order to optimize aircraft control, the backup control signals from each backup partitions may be fed to the cross-side backup partition via communication links 126 and 127 for processing. For example, the backup control signals may be scaled and summed together and the sum of the two signals may be limited to the maximum value allowed by a single controller. In this way, the input from both pilot controllers will be included in the aircraft level command computation. The backup partition 120, may be configured to transmit the backup control signals to the left side actuator channels. Likewise, the backup partition 121 may transmit the backup control signals to the right side actuator channels. As understood by those of skill in the art, the terms left and right should not be limited to channels physically located on the left and right side of an aircraft, but rather the terms left and right may indicate the source of command data for a given actuator channel.

The health of the overall backup control paths may be monitored on a continuous basis during the normal operation, so that its availability and even accuracy can be verified even when not in use. If all of the primary control command sources become unavailable or in the event of a general fault in the primary control system renders it unavailable, the control system 200 may be configured to switch to the backup control signals generated by the backup control system. If smart actuators are used, the smart actuators may be configured to automatically switch between the primary and backup control signals if the primary control signal is determined to be invalid or absent.

It should be understood that the processor units 101 shown in FIG. 2 may be configured to perform other aircraft functions, such as outputting signals for cockpit display, such as crew alerting system (CAS) or maintenance signals.

In an alternative embodiment of the invention, the primary partition 130 and the backup partition 120 of the control stick 110 and the primary partition 131 and 121 of the control stick 111 may include software partitions within the active stick controller software instead of being physically separated partitions. The partitions may also be kept strictly physically isolated to minimize the possibility of one partition affecting the operation of another partition. Additionally, the control stick 110 and the control stick 111, including the primary partitions and the backup partitions, may be configured as a dissimilar design compared to the primary controller. For example, the dissimilarity may be based on hardware and/or software. The dissimilarity between the primary controllers and the control sticks 110 and 111 may also include using different signal processing algorithms and different aircraft level control laws between the primary and the backup control systems.

Figure 3:
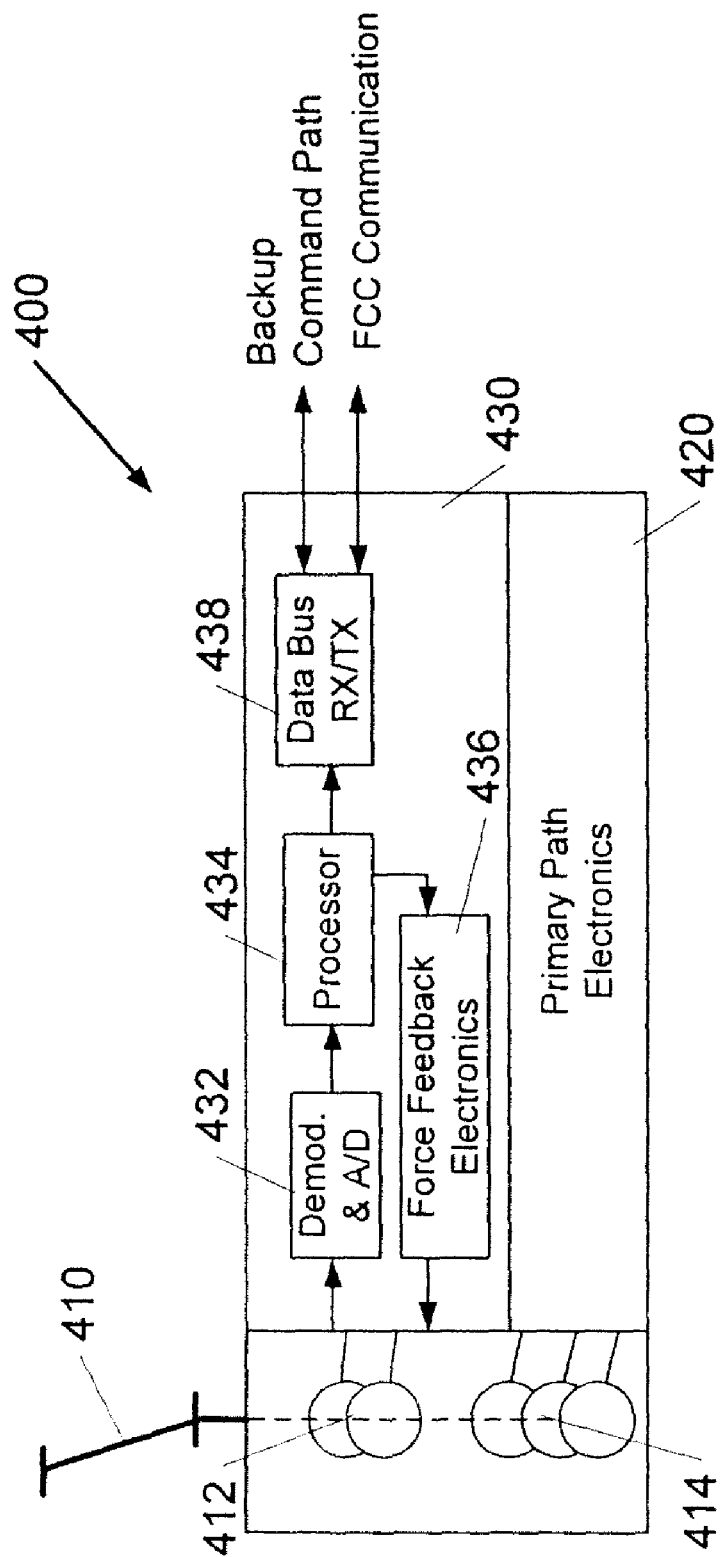
FIG. 3 schematically illustrates a active control stick with electronics in accordance with one embodiment of the present invention.

FIG. 3 schematically illustrates an active control stick 400 in accordance with one embodiment of the invention. The active control stick 400, as shown in FIG. 3, includes a control stick 410, and primary and backup sensors 412 and 414. The active control stick 400 is also shown with a primary partition 420 and a backup partition 430. As discussed with reference to FIG. 2, the primary partition may form a component of the primary control system in different ways. For example the primary partition may include a voter and signal verification device or may function as a simple primary transmission path for transmitting an analog signal from the control stick sensors to the FCC.

The backup partition 430 may be configured to include active control stick electronics and backup control system electronics. As shown in FIG. 3, the backup partition 430 includes a demodulator and analog to digital converter 432, a processor 434, and force feedback electronics 436. The backup partition may also include a data bus receiver and transmitter device 438 for communicating with other backup control system components and with the FCC for other information, such as force gradients and soft stops, etc. The backup control system may utilize the existing active control stick electronics 432, 434, 436, and 438 as a backup system solution for the primary control system. It should be noted the above description may be further simplified if the active stick function, for example, is not required in the backup control mode of the flight control system. The processor 434 may alternatively be implemented by using analog electronics and the data bus interface 438 may also be implemented by using analog signal drivers.

Figure 4:
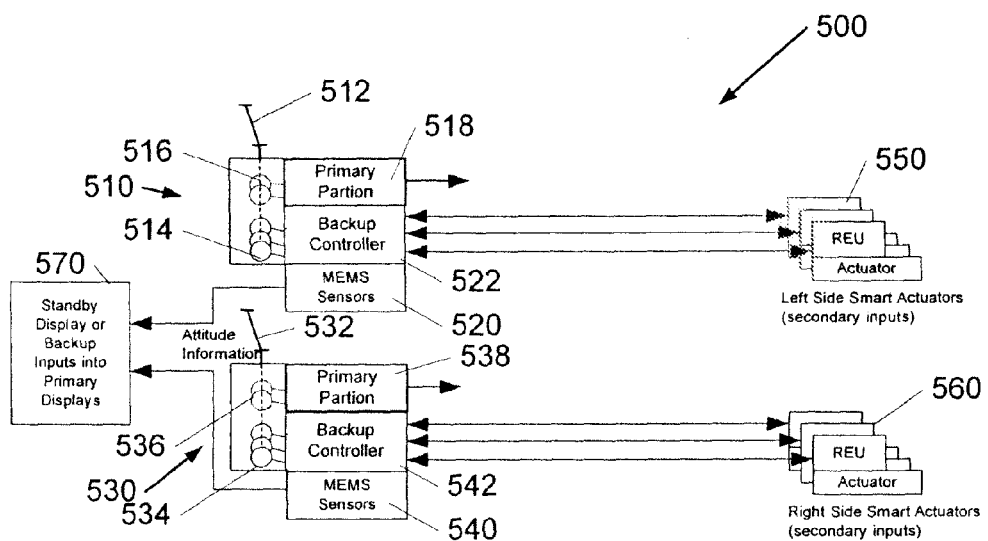
FIG. 4 schematically illustrates an augmented backup control system in accordance with another embodiment of the present invention.

As mentioned above, in aircraft designed with a relaxed static stability or in aircraft with a particular natural dynamic motion of the aircraft that requires damping (such as Dutch-roll motion via the yaw damper) the backup or backup control system requires certain augmentation signals from backup sensors (e.g. aircraft angular rates) in order to properly control the aircraft. FIG. 4 illustrates one embodiment of an augmented backup control system 500.

As shown in FIG. 4, the backup control system 500 includes the backup controllers 522 and 542 positioned within the active control sticks 510 and 530. The backup controller 522 receives input signals from the control stick 512 and the backup sensor 514. The backup controller 542 receives input signals from the control stick 532 and the backup sensor 534. In accordance with this embodiment, the MEMS or other type of backup rate or acceleration sensors 520 provides augmentation signals to the backup controller 522 and the MEMS sensors 540 provides augmentation signals to the backup controller 542.

The augmentation signals from the MEMS sensors 520 and 540, which may be configured to provide aircraft attitude, angular rate, and linear acceleration data, may also be utilized by the standby instrument displays or as backup inputs into the primary displays. Such an arrangement may allow a part number reduction at the aircraft level, which, in turn, may save weight and cost of the aircraft. The primary partitions 518 and 538 may receive signals from the control sticks 512 and 532 and the primary sensors 516 and 536. The primary control system may be implemented as discussed above or as known by those of skill in the art. The combination of sensors within the active control stick may serve to optimize the total amount of backup sensors at the aircraft level. Further, the MEMS sensors may be configured, as shown in FIG. 4, to serve multiple aircraft functions, such as input signals for standby displays and augmentation signals for a backup control system, while optimizing the utilization of MEMS sensors.

Upon computing a backup control signal, the backup controller 522 of the active control stick 510 may be configured to provide the backup control signals to the aircraft actuators. As shown in FIG. 4, the backup controller 522 provides backup control signals to left side smart actuators 550. Likewise, the backup controller 542 provides backup control signals to right side smart actuators 560. The smart actuators may include remote electronics units as shown in the figure. As would be apparent to those of skill in the art, the backup controllers 522 and 542 may be cross-linked or otherwise configured. Furthermore, the sensors 520 and 540 may be installed as individual and separate units in the aircraft.

Figure 5:
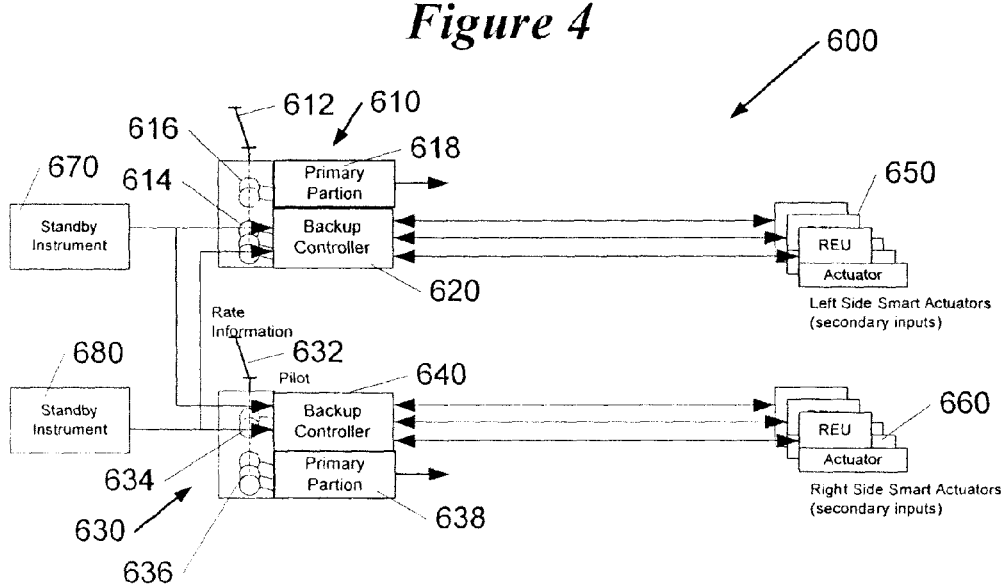
FIG. 5 schematically illustrates another augmented backup control system in accordance with another embodiment of the present invention.

FIG. 5 illustrates an alternative embodiment of an augmented backup control system where the standby instruments 670 and 680, as with the sensors 520 and 540 shown in FIG. 4, may provide the required augmentation sensor data to the backup controller in aircraft designed with a relaxed static stability or in aircraft with a particular natural dynamic motion. As shown in FIG. 5, the backup control system 600 includes the backup controllers 620 and 640 positioned within the active control sticks 610 and 630. The backup controller 620 receives input signals from the control stick 612 and the backup sensor 614. The backup controller 640 receives input signals from the control stick 632 and the backup sensor 634.

In accordance with the embodiment of the invention shown in FIG. 5, the sensor signals computed by the standby instruments may be forwarded to the backup controller. As shown in FIG. 5, the standby instrument 670 is configured to provide both backup controllers 620 and 640 with augmentation signals. The standby instrument 680 is configured to provide both the backup controllers 620 and 640 with augmentation signals.

As such, the flight data provided to the standby instruments 670 and 680 may be utilized for multiple aircraft functions, displaying the flight data for the standby displays and providing augmentation signals to the backup controllers. It should also be understood that the flight data from backup sensors as shown in FIGS. 4 and 5 may be used by the active control stick in order to process any force feed back computations for the control stick.

The primary partitions 618 and 638 may receive signals from the control sticks 612 and 632 and the primary sensors 616 and 636. The primary control system may be implemented as discussed above or, alternatively, as known by those of skill in the art. The combination of sensors within the active control stick may serve to optimize the total amount of sensors at the aircraft level. Further, the MEMS or other type of backup sensors may be configured, as shown in FIG. 4, to serve multiple aircraft functions, such as input signals for standby displays and augmentation signals for a backup control system, while optimizing the utilization of MEMS sensors.

Upon computing a backup control signal, the backup controller 620 of the active control stick 610 may be configured to provide the backup control signals to the aircraft actuators. As shown in FIG. 5, the backup controller 620 provides backup control signals to left side smart actuators 650. Likewise, the backup controller 640 provides backup control signals to right side smart actuators 660. The smart actuators may include remote electronics units as shown in the figure. Although smart actuators are shown in FIGS. 4 and 5, other actuators known to those of skill in the art may be used. Also, as would be apparent to those of skill in the art, the backup controllers 620 and 640 may cross-linked or otherwise configured without deviating from the scope and spirit of the present invention.

The foregoing descriptions of specific embodiments of the present invention are presented for purposes of illustration and description. They are not intended to be exhaustive or to limit the invention to the precise forms disclosed. Obviously, many modifications and variations are possible in view of the above teachings. While the embodiments were chosen and described in order to best explain the principles of the invention and its practical applications, thereby enabling others skilled in the art to best utilize the invention, various embodiments with various modifications as are suited to the particular use are also possible. The scope of the invention is to be defined only by the claims appended hereto, and by their equivalents.

What is claimed is:

1. A flight control system for controlling an aircraft in flight, the flight control system comprising:
    an actuated control stick comprising a primary sensor, a backup sensor, and a processing unit having at least one processor configured to generate a tactile signal for the actuated control stick;
    a set of primary electronics coupled to the primary sensor and located in the processing unit, the set of primary electronics being configured to receive a primary control stick signal from the primary sensor and to generate at least one primary control signal based, at least in part, on the primary control stick signal;
    a set of backup electronics coupled to the backup sensor and located in the processing unit, the set of backup electronics being configured to receive a backup control stick signal from the backup sensor and to generate at least one backup control signal based, at least in part, on the backup control stick signal; and
    at least one aircraft actuator coupled to the set of primary electronics and coupled to the set of backup electronics, the at least one aircraft actuator being configured to receive the primary control signal from the set of primary electronics and the backup control signal from the set of backup electronics and being further configured to actuate based, at least in part, on at least one of the primary control signal or the backup control signal.

2. The flight control system of claim 1, wherein the set of backup electronics includes the at least one processor and is configured to generate the tactile signal and the backup control signal.

3. The flight control system of claim 2, wherein the set of backup electronics includes a feedback electronics unit connected between the at least one processor and the actuated control stick.

4. The flight control system of claim 1, wherein the set of primary electronics includes the at least one processor.

5. The flight control system of claim 4, wherein the set of backup electronics further includes a first processor configured to generate the backup control signal.

6. The flight control system of claim 4, wherein the set of backup electronics includes analog processing equipment and is configured to generate the at least one backup control signal as an analog signal.

7. The flight control system of claim 1, wherein the at least one processor provides aircraft flight data to the processing unit and the tactile signal is based, at least in part, on the aircraft flight data received from the at least one processor.

8. The flight control system of claim 1, wherein the at least one aircraft actuator is configured to determine whether the primary control signal is valid and is configured to use the backup control signal to control the at least one aircraft actuator in the event that the received primary control signal is determined to be invalid.

9. The flight control system of claim 1, wherein the set of primary electronics is coupled to a primary processor located external to the processing unit.

10. A flight control system for controlling an aircraft in flight, the flight control system comprising:
   a first actuated control stick comprising a first primary sensor, a first backup sensor, and a first processing unit having at least one first processor configured to generate a first tactile signal for the first actuated control stick;
   a first set of primary electronics coupled to the first primary sensor and located in the first processing unit, the first set of primary electronics being configured to receive a first primary control stick signal from the first primary sensor and to generate at least one primary control signal based, at least in part, on the first primary control stick signal;
   a second actuated control stick comprising a second primary sensor, a second backup sensor, and a second processing unit having at least one second processor configured to generate a second tactile signal for the second actuated control stick;
   a second set of primary electronics coupled to the second primary sensor and located in the second processing unit, the second set of primary electronics being configured to receive a second primary control stick signal from the second primary sensor and to generate at least one primary control signal based, at least in part, on the second primary control stick signal;
   a first set of backup electronics coupled to the first backup sensor and located in the first processing unit, the first set of backup electronics being configured to receive a first backup control stick signal from the first backup sensor and to generate a first backup control signal based, at least in part, on the first backup control stick signal;
   a second set of backup electronics coupled to the second backup sensor and located in the second processing unit, the second set of backup electronics being configured to receive a second backup control stick signal from the second backup sensor and to generate a second backup control signal based, at least in part, on the second backup control stick signal; and
   at least one aircraft actuator coupled to the at least one of the first set of primary electronics or the second set of primary electronics and to at least one of the first set of backup electronics or the second set of backup electronics, the at least one aircraft actuator being configured to receive at least one of the primary control signals from the first set of primary electronics or the second set of primary electronics and at least one of the first backup control signal or the second backup control signal and being configured to control an aircraft based, at least in part, on at least one of the primary control signals, the first backup control signal, or the second backup control signal.

11. The flight control system of claim 10, wherein:
   the first set of backup electronics includes the at least one first processor and is configured to generate the first tactile signal and the first backup control signal; and
   the second set of backup electronics includes the at least one second processor and is configured to generate the second tactile signal and the second backup control signal.

12. The flight control system of claim 11, wherein:
   the first set of backup electronics includes a first feedback electronics unit connected between the at least one first processor and the first actuated control stick; and
   the second set of backup electronics includes a second feedback electronics unit connected between the at least one second processor and the second actuated control stick.

13. The flight control system of claim 11, wherein:
   the first set of primary electronics transmits the first primary control stick signal as a first analog signal; and
   the second set of primary electronics transmits the second primary control stick signal as a second analog signal.

14. The flight control system of claim 10, wherein:
   the first set of primary electronics includes a third processor configured to generate the first tactile signal for the first actuated control stick; and
   the second set of primary electronics includes a fourth processor configured to generate the second tactile signal for the second actuated control stick.

15. The flight control system of claim 14, wherein:
   the first set of backup electronics includes a fifth processor configured to generate the first backup control signal; and
   the second set of backup electronics includes a sixth processor configured to generate the second backup control signal.

16. The flight control system of claim 14, wherein:
   the first set of backup electronics includes first analog processing equipment and is configured to generate the first backup control signal as a first analog signal; and
   the second set of backup electronics includes second analog processing equipment and is configured to generate the second backup control signal as a second analog signal.

17. The flight control system of claim 10, wherein the first set of backup electronics and the second set of backup electronics are cross-linked.

18. The flight control system of claim 10, wherein:
   the first set of backup electronics is configured to transmit the first backup control signal on a first set of aircraft actuator channels; and
   the second set of backup electronics is configured to transmit the second backup control signal on a second set of aircraft actuator channels.

19. The flight control system of claim 10, wherein the first set of primary electronics and the second set of primary electronics include a signal processing device.

20. The flight control system of claim 10, wherein the first set of backup electronics and the second set of backup electronics are configured to receive flight data from at least one sensor sensing at least one of attitude, rate, or acceleration.

21. The flight control system of claim 10, wherein the first set of primary electronics and the second set of primary electronics are coupled to a primary processor located external to the processing unit.

* * * * *